(12) United States Patent
Thelin

(10) Patent No.: US 7,114,029 B1
(45) Date of Patent: Sep. 26, 2006

(54) DISK DRIVE EMPLOYING A MULTI-PHASE ROTATIONAL POSITION OPTIMIZATION (RPO) ALGORITHM

(75) Inventor: Gregory B. Thelin, Garden Grove, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 391 days.

(21) Appl. No.: 10/286,127

(22) Filed: Oct. 31, 2002

(51) Int. Cl.
G06F 12/00 (2006.01)
G11B 5/596 (2006.01)

(52) U.S. Cl. ..................................... 711/112; 711/158
(58) Field of Classification Search ........ 711/111–113, 711/154, 156, 158, 151; 710/5–7, 39, 41, 710/43, 264, 40, 45
See application file for complete search history.

(56) References Cited

U.S. PATENT DOCUMENTS

| | | | |
|---|---|---|---|
| 4,888,691 A | 12/1989 | George et al. | |
| 5,220,653 A | 6/1993 | Miro | |
| 5,381,539 A | 1/1995 | Yanai et al. | |
| 5,729,718 A | 3/1998 | Au | |
| 5,845,318 A * | 12/1998 | Rose et al. | 711/113 |
| 5,991,825 A * | 11/1999 | Ng | 710/6 |
| 6,078,998 A * | 6/2000 | Kamel et al. | 711/151 |
| 6,084,733 A | 7/2000 | Ohzeki et al. | |
| 6,084,799 A | 7/2000 | Tanzawa et al. | |
| 6,141,728 A * | 10/2000 | Simionescu et al. | 711/113 |
| 6,145,052 A * | 11/2000 | Howe et al. | 711/112 |
| 6,185,058 B1 | 2/2001 | Dobbek et al. | |
| 6,272,565 B1 | 8/2001 | Lamberts | |
| 6,279,108 B1 | 8/2001 | Squires et al. | |
| 6,343,351 B1 | 1/2002 | Lackman et al. | |
| 6,360,243 B1 | 3/2002 | Lindsley et al. | |
| 6,418,510 B1 | 7/2002 | Lamberts | |
| 6,442,648 B1 * | 8/2002 | Genduso et al. | 711/112 |
| 6,515,819 B1 * | 2/2003 | Schmidt et al. | 360/78.04 |
| 6,618,780 B1 | 9/2003 | Popat | |
| 6,711,628 B1 | 3/2004 | Thelin | |
| 6,721,906 B1 * | 4/2004 | Hirashita et al. | 714/54 |
| 6,789,132 B1 | 9/2004 | Hoskins | |
| 6,826,630 B1 | 11/2004 | Olds et al. | |
| 6,845,405 B1 | 1/2005 | Thelin | |
| 6,877,070 B1 * | 4/2005 | Espeseth et al. | 711/137 |
| 2002/0124135 A1 * | 9/2002 | Newman | 711/113 |
| 2002/0199038 A1 | 12/2002 | Mamiya et al. | |
| 2003/0056034 A1 * | 3/2003 | Olds et al. | 710/5 |
| 2003/0056059 A1 * | 3/2003 | Fox et al. | 711/112 |
| 2003/0188092 A1 | 10/2003 | Heath et al. | |
| 2003/0204687 A1 * | 10/2003 | Hyde et al. | 711/158 |
| 2004/0019745 A1 | 1/2004 | Espeseth et al. | |
| 2004/0034750 A1 | 2/2004 | Horn | |
| 2005/0055517 A1 | 3/2005 | Olds et al. | |

\* cited by examiner

*Primary Examiner*—Matthew Kim
*Assistant Examiner*—Shane M. Thomas
(74) *Attorney, Agent, or Firm*—Howard H. Sheerin, Esq

(57) ABSTRACT

A disk drive is disclosed which executes a rotational position optimization (RPO) algorithm for selecting a next command to execute out of a plurality of pending commands. The RPO algorithm comprises a first phase and a second phase. The first phase of the RPO algorithm is executed relative to a first priority and in response to at least one non-real-time parameter. The second phase of the RPO algorithm is executed relative to a second priority higher than the first priority and in response to at least one real-time parameter.

12 Claims, 6 Drawing Sheets

DISK DRIVE EMPLOYING A MULTI-PHASE ROTATIONAL POSITION OPTIMIZATION (RPO) ALGORITHM

BACKGROUND OF THE INVENTION

1. Field of the Invention

The present invention relates to disk drives for computer systems. More particularly, the present invention relates to a disk drive employing a multi-phase rotational position optimization (RPO) algorithm.

2. Description of the Prior Art

A disk drive may employ an RPO algorithm in order to execute commands in an order which minimizes the seek latency of the head as well as the rotational latency of the disk. After executing a current command, the RPO algorithm will typically evaluate seek parameters to select the next command that minimizes the access time with respect to the radial and circumferential location of the head. However, it may be desirable for the RPO algorithm to consider other parameters in addition to seek parameters when ordering the commands in the RPO queue. For example, if the disk drive is low on cache memory the RPO algorithm may order the write commands in the RPO queue relative to their size so that larger write commands will be executed first, thereby freeing cache memory for other commands. However, increasing the number of parameters considered by the RPO algorithm increases the computational complexity and latency, thereby degrading the ability to select the next best command in real-time.

SUMMARY OF THE INVENTION

The present invention may be regarded as a disk drive comprising a disk and a head actuated radially over the disk. The disk drive further comprises a disk controller for executing a rotational position optimization (RPO) algorithm for selecting a next command to execute out of a plurality of pending commands, the RPO algorithm comprising a first phase and a second phase. The first phase of the RPO algorithm is executed relative to a first priority and in response to at least one non-real-time parameter. The second phase of the RPO algorithm is executed relative to a second priority higher than the first priority and in response to at least one real-time parameter.

In one embodiment, the disk drive further comprises a plurality of allocation state queues for storing commands comprising cache segments having an allocation state selected from the group comprising at least:
  available—an allocated cache segment storing write data that has been written to the disk;
  valid—an allocated cache segment storing cached read data; and
  dirty—an allocated cache segment storing write data not yet written to the disk,
wherein the non-real time parameter comprises an allocation state.

In another embodiment, the non-real time parameter comprises a cache segment size. In one embodiment, the disk drive further comprises a voice coil motor for actuating the head radially over the disk, and the real time parameter comprises a temperature of the voice coil motor.

In yet another embodiment, the disk comprises a plurality of tracks, each track comprising a plurality of blocks and a plurality of embedded servo sectors recorded at a predetermined interval. The disk controller enables a counter relative to a reference servo sector and modifies the counter as the head passes each servo sector. When the first phase of the RPO algorithm terminates, the second phase of the RPO algorithm processes the counter to select the next command to execute.

The present invention may also be regarded as a method of executing a rotational position optimization (RPO) algorithm in a disk drive for selecting a next command to execute out of a plurality of pending commands. The disk drive comprising a disk and a head actuated radially over the disk, and the RPO algorithm comprising a first phase and a second phase. The first phase of the RPO algorithm is executed relative to a first priority and in response to at least one non-real-time parameter. The second phase of the RPO algorithm is executed relative to a second priority higher than the first priority and in response to at least one real-time parameter.

DESCRIPTION OF THE PREFERRED EMBODIMENTS

Figure 1A:
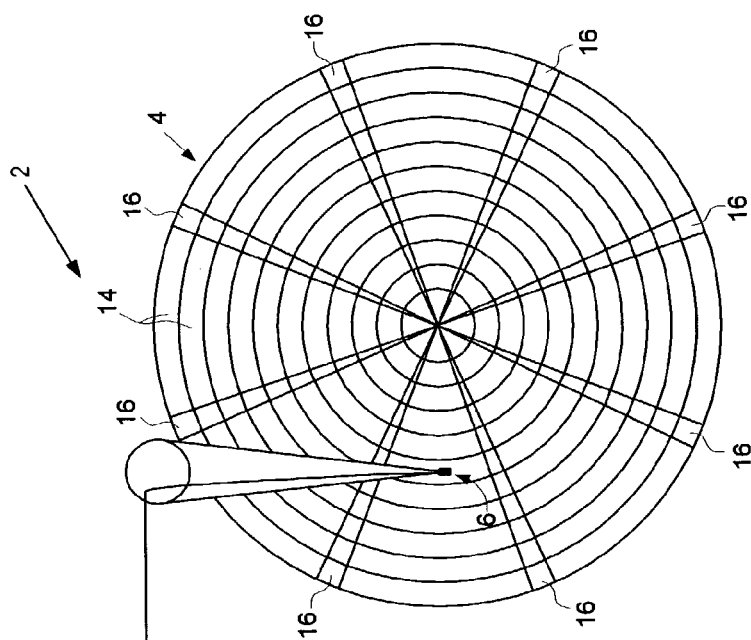
FIGS. 1A–1B show a disk drive according to an embodiment of the present invention wherein a disk controller executes a first phase of an RPO algorithm relative to a first priority and in response to at least one non-real-time parameter, and a second phase of the RPO algorithm relative to a second priority higher than the first priority and in response to at least one real-time parameter.
Figure 1B:
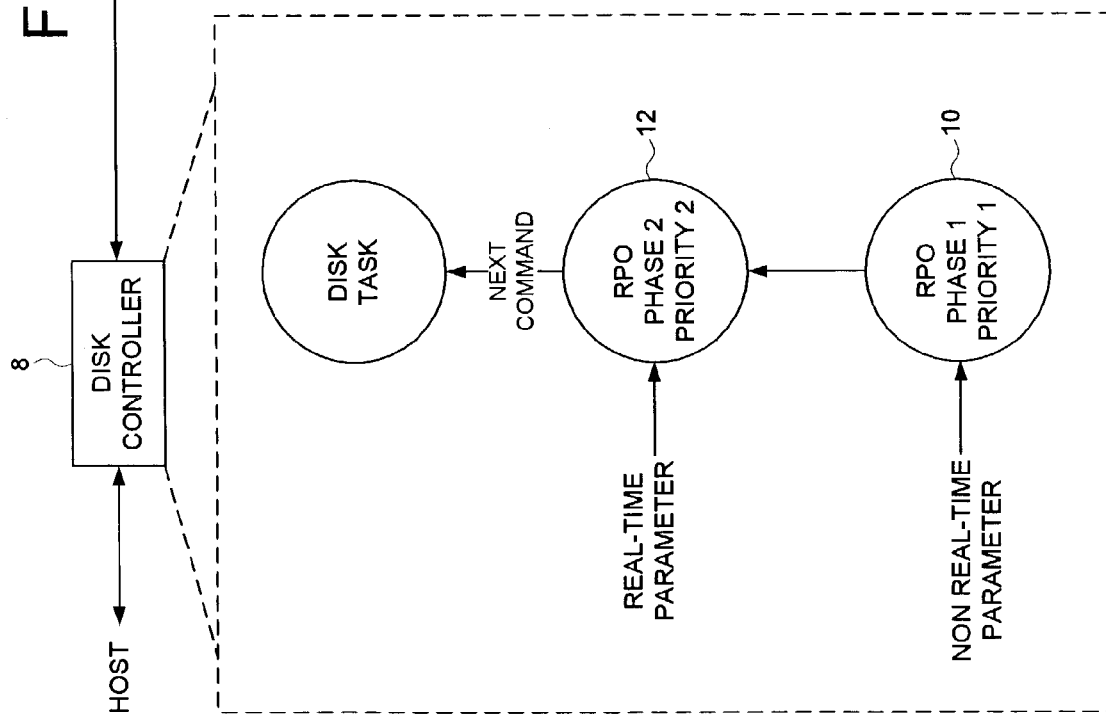

FIG. 1A shows a disk drive 2 according to an embodiment of the present invention comprising a disk 4 and a head 6 actuated radially over the disk 4. The disk drive 2 further comprises a disk controller 8 for executing a rotational position optimization (RPO) algorithm for selecting a next command to execute out of a plurality of pending commands, the RPO algorithm comprising a first phase 10 and a second phase 12. As illustrated in FIG. 1B, the disk controller 8 executes the first phase 10 of the RPO algorithm relative to a first priority and in response to at least one non-real-time parameter. The disk controller 8 executes the second phase 12 of the RPO algorithm relative to a second priority higher than the first priority and in response to at least one real-time parameter.

In one embodiment, the disk 4 comprises a plurality of radially spaced concentric tracks 14 each comprising a plurality of data sectors and a plurality of embedded servo sectors 16 recorded at a predetermined interval around the circumference of the track. Each embedded servo sector 16 comprises coarse head positioning information (e.g., a track number) processed to position the head 6 over a target track, and fine head positioning information (e.g., servo bursts) processed to maintain the head 6 over a centerline of the target track during read and write operations. Any suitable disk format may be employed in the embodiments of the present invention including a spiral track format.

Figure 2:
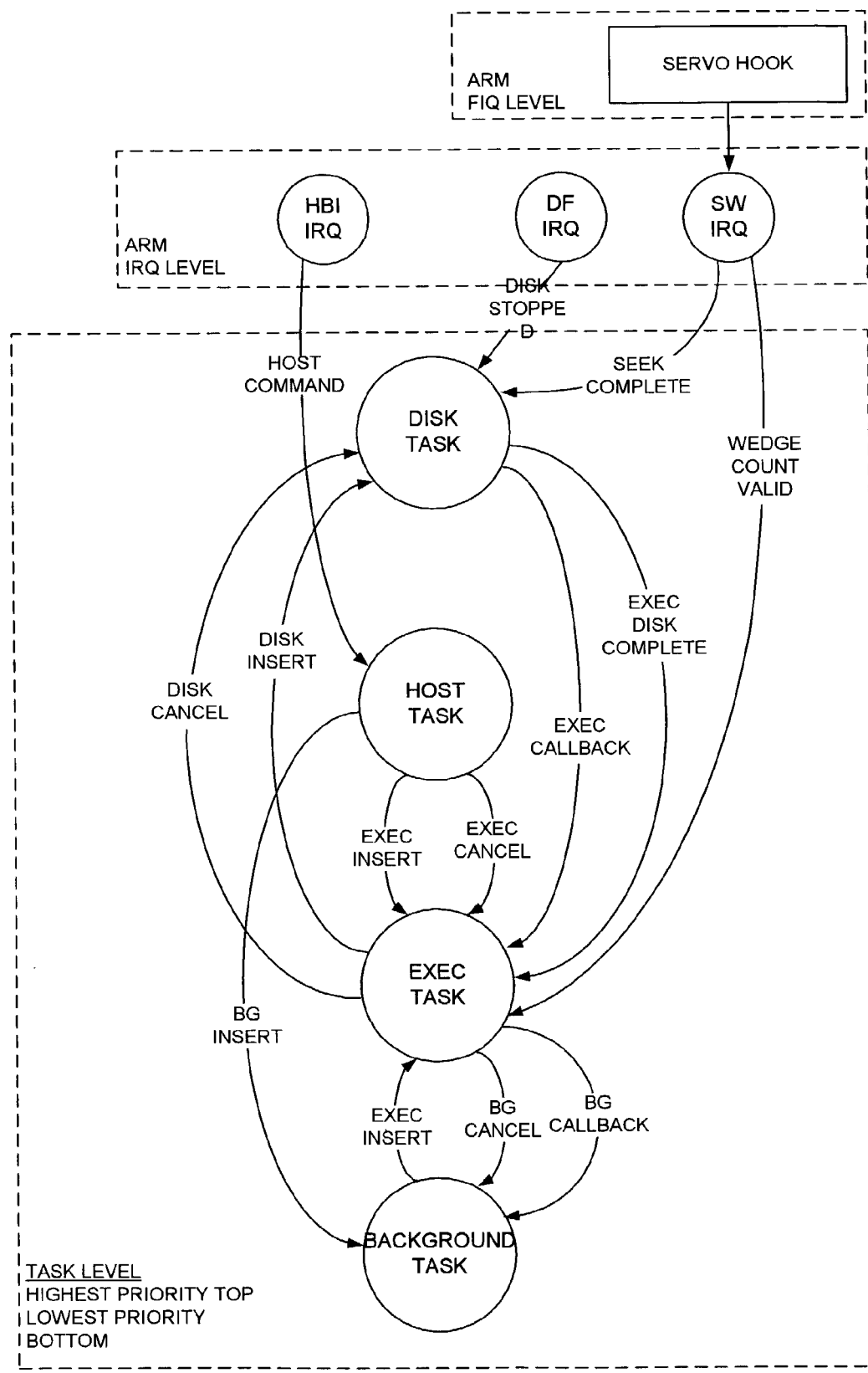
FIG. 2 is a flow diagram of a multitasking operating system executed by the disk drive according to an embodiment of the present invention wherein the first phase of the RPO algorithm is executed during an EXEC TASK with interrupts enabled, and the second phase of the RPO algorithm is executed during the EXEC TASK with interrupts disabled.

FIG. 2 shows a flow diagram of a multitasking operating system executed by the disk controller 8 according to an embodiment of the present invention. In this embodiment, the disk controller 8 executes a DISK TASK, a HOST TASK, an EXEC TASK and a BACKGROUND TASK, wherein the DISK TASK has the highest priority and the BACKGROUND TASK has the lowest priority.

DISK TASK is responsible mainly for disk formatting operations for read/write commands, such as determining the track format including number and location of defects and configuring the read/write channel circuitry with appropriate parameters. The DISK TASK runs in response to disk formatting hardware (DF IRQ) and servo wedge hardware (SW IRQ) indicating that a requested seek has completed.

HOST TASK is responsible for receiving commands from the host. It runs in response to commands received from the host bus interface (HBI) hardware.

EXEC TASK is responsible for implementing the multiphase rotational position optimization (RPO) algorithm for selecting the next command to be executed by the DISK TASK. It typically runs after the DISK TASK has emptied a pipeline slot.

BACKGROUND TASK is responsible for implementing background operations. It typically initiates read/write commands not initiated by the host, for example, while performing diagnostic or calibration procedures.

There are also a number of event flags associated with each of the tasks:

HOST COMMAND EVENT set by the HBI interrupt service routine when a new command is received from the host.

DISK STOPPED EVENT set by the DF interrupt service routing in connection with a data formatting operation for a current command.

DISK INSERT EVENT set by the EXEC TASK when a next command is inserted into the "next" pipeline slot for the DISK TASK. This signals the DISK TASK to pipeline the next command behind the current command being executed.

EXEC DISK COMPLETE EVENT set by the DISK TASK when it moves the next command from the "next" pipeline slot into the "current" pipeline slot. This signals the EXEC TASK to execute the RPO algorithm to select the next command to execute.

EXEC CALLBACK EVENT set by the DISK TASK after completing the command requested by the EXEC TASK.

EXEC INSERT EVENT set by the HOST TASK and BACKGROUND TASK to execute the RPO algorithm based on desired criteria, for example, flushing write commands to free-up cache resources.

EXEC CANCEL EVENT set by the HOST TASK to cancel a command sent to the EXEC TASK.

BACKGROUND CALLBACK EVENT set by the EXEC TASK after processing the command requested by the BACKGROUND TASK.

BACKGROUND CANCEL EVENT set by the EXEC TASK to cancel the command requested by the BACKGROUND TASK.

DISK CANCEL EVENT set by the EXEC TASK to cancel the command in the "next" pipeline slot.

SEEK COMPLETE EVENT set by the servo wedge (SW) ISR to signal the DISK TASK that the requested seek operation has been completed.

WEDGE COUNT VALID EVENT set by the servo wedge (SW) ISR to signal the EXEC TASK that the wedge count is valid and that the second phase of the RPO algorithm may commence.

BACKGROUND INSERT EVENT set by the HOST TASK to start background processing such as diagnostic or calibration procedure.

In the embodiment of FIG. 2, the EXEC TASK executes the first phase 10 of the RPO algorithm with interrupts enabled so that the EXEC TASK can be interrupted by higher priority tasks. While executing the second phase 12 of the RPO algorithm, interrupts are disabled so that the EXEC TASK becomes the highest priority task. In this manner the first phase 10 of the RPO algorithm is executed in non-real-time in response to non-real-time parameters and the second phase 12 of the RPO algorithm is executed in real-time in response to real-time parameters.

Figure 3:
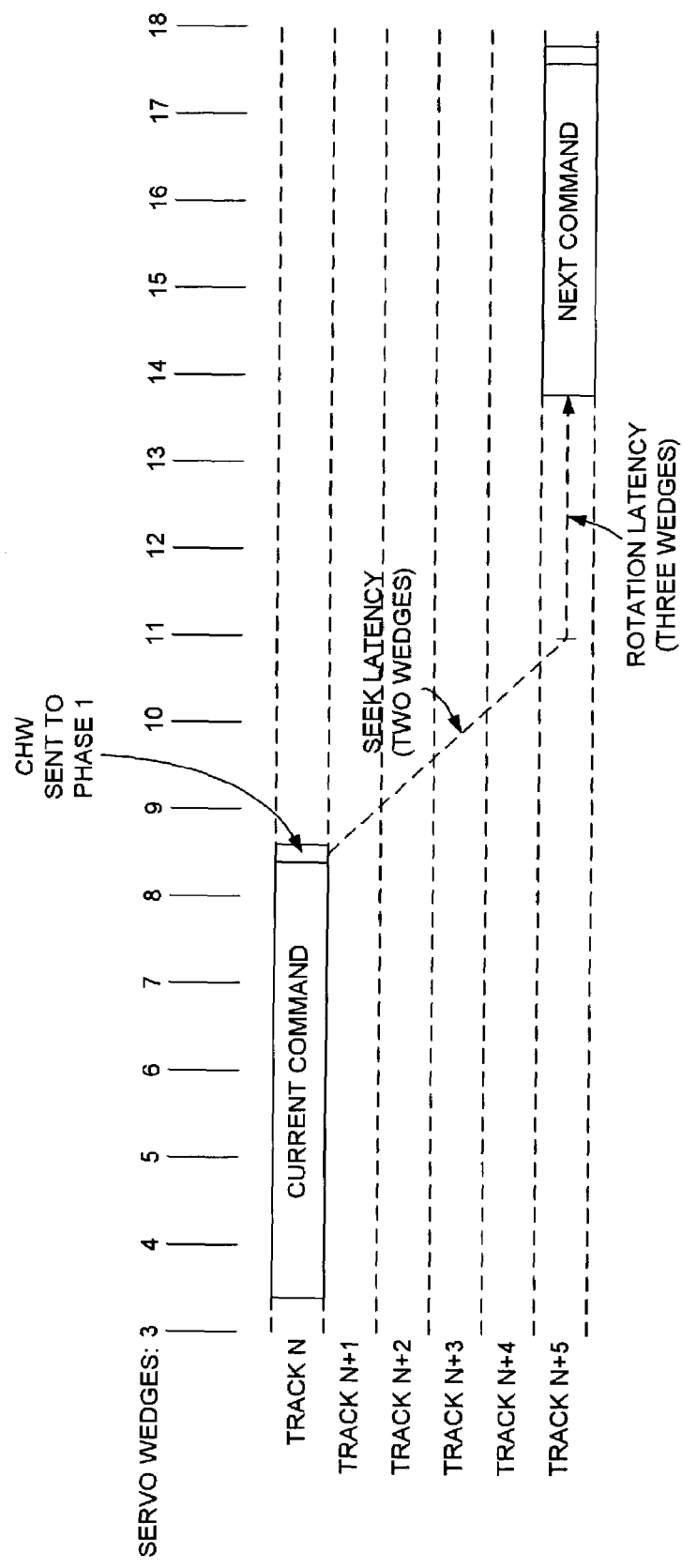
FIG. 3 illustrates an embodiment of the present invention wherein the RPO algorithm computes a seek latency and a rotational latency for each of the pending commands.

FIG. 3 illustrates an embodiment of the present invention wherein the RPO algorithm computes a seek latency and a rotational latency for each of the pending commands. The seek and rotational latency is computed relative to a reference wedge (cylinder/head/wedge or CHW) of a current command. In the example shown in FIG. 3, the reference wedge is 9 corresponding to the location of the last data sector of the current command. Seeking the head 6 to a next command takes two servo wedges, and waiting for the disk 4 to rotate until the head 6 is over the first target sector of the next command takes three servo wedges. In one embodiment, look-up tables are employed to determined the seek latency from a current command to a next command.

Figure 4:
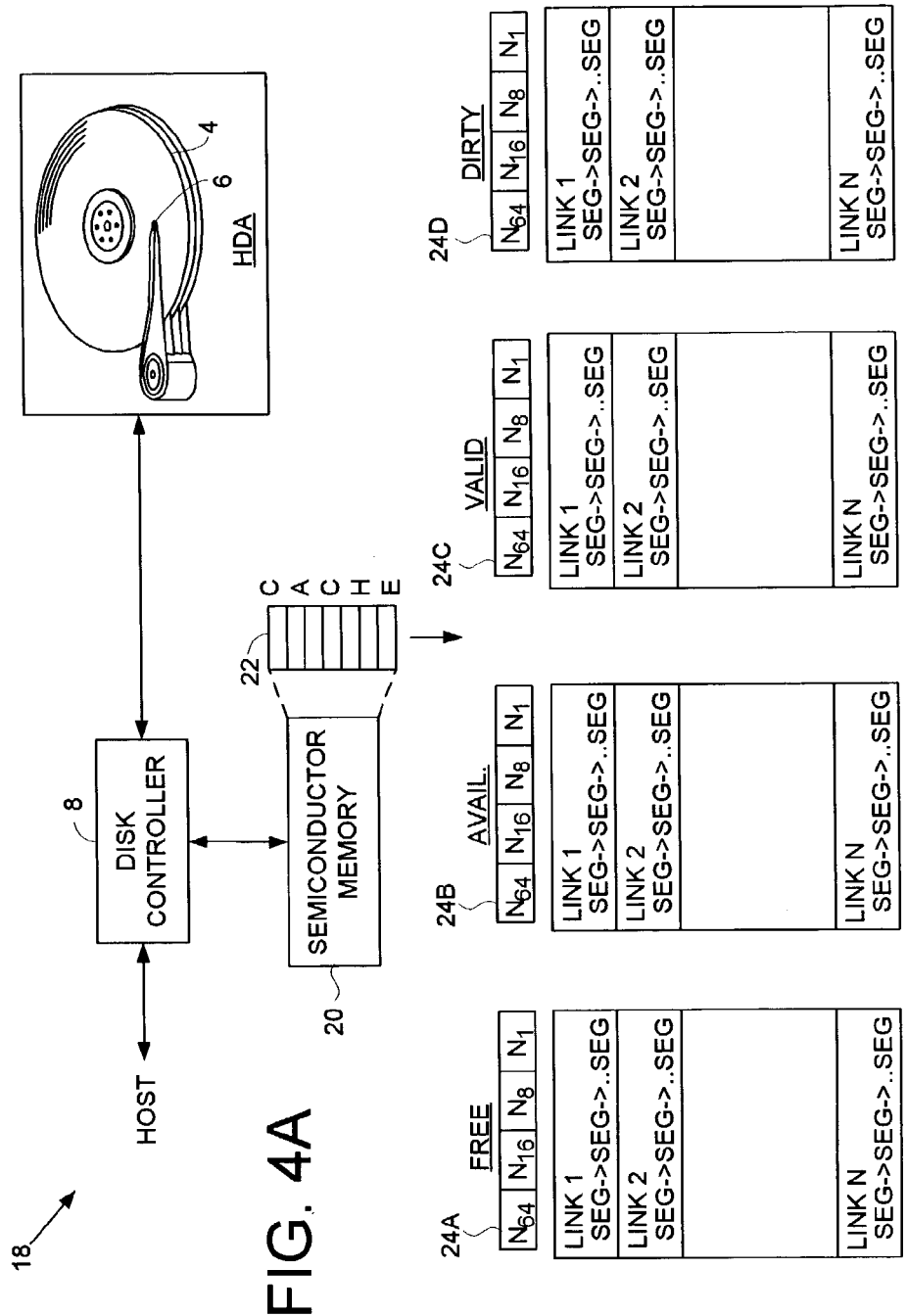
FIGS. 4A–4B show a disk drive according to an embodiment of the present invention comprising a plurality of allocation state queues for storing commands comprising cache segments having an allocation state, wherein the non-real-time parameter comprises an allocation state.

FIG. 4A shows a disk drive 18 according to an embodiment of the present invention comprising a semiconductor memory 20 including a cache buffer 22 for caching data written to the disk 4 and data read from the disk 4. The cache buffer 22 comprises a plurality of cache segments linked together to form a plurality of cache links. The disk controller 8 maintains at least one segment attribute associated with each cache segment, wherein the segment attribute comprises an allocation state selected from the group comprising at least:

free—an unallocated cache segment;

available—an allocated cache segment storing write data that has been written to the disk;

valid—an allocated cache segment storing cached read data; and dirty—an allocated cache segment storing write data not yet written to the disk.

The disk controller 8 further maintains at least one link attribute associated with the segment attributes within each cache link. When the disk controller 8 receives a host command comprising a command size indicating a number of blocks of data associated with the host command, the disk controller 8 evaluates the link attributes to allocate cache segments for a cache link associated with the host command. In the embodiment of FIG. 4B, the cache buffer 22 comprises a plurality of segment pools, where each segment pool comprising a plurality of cache segments, and each cache segment comprises $2^k$ number of blocks where k is a predetermined integer for each segment pool. The link attribute identifies cache segments in each of the segment pools for the allocation state. The segment pools comprise a one-block segment pool, an eight-block segment pool, a sixteen-block segment pool, and a sixty-four-block segment pool. The link attributes 24A–24D comprise counters for tracking the number of cache segments within each segment pool and for each allocation state.

In one embodiment, the non-real-time parameter processed by the first phase 10 of the RPO algorithm comprises an allocation state. For example, if the number of cache segments comprising a dirty allocation state exceeds a predetermined threshold, the first phase 10 of the RPO algorithm is configured to select commands having a dirty allocation state (write commands) as the next commands to execute so that the write data is "flushed" to the disk 4. The first phase 10 of the RPO algorithm computes a seek and rotational latency for each write command relative to the reference servo wedge. When the second phase 12 of the RPO algorithm is executed, the seek and rotational latencies are updated for each write command relative to at least one real-time parameter, and the write command having the minimum seek and rotational latency is selected as the next command to execute.

In another embodiment, the non-real-time parameter processed by the first phase 10 of the RPO algorithm comprises a cache segment size. Referring again to FIG. 4B, if the number of eight-block cache segments having a free or available allocation state falls below a predetermined threshold, the first phase 10 of the RPO algorithm is configured to select commands utilizing eight-block cache segments as the next commands to execute.

Any suitable real-time parameter may be processed by the second phase 12 of the RPO algorithm. In one embodiment, the disk drive comprises a voice coil motor for actuating the head radially over the disk, and the real-time parameter comprises a temperature of the voice coil motor. The disk controller 8 will not perform a seek unless the temperature of the VCM is within an acceptable level. A temperature of the voice coil is derived, for example, through a temperature sensor or evaluating the frequency and duration of past seeks. The derived temperature is converted into a coil temp value (CTV) representing a number of servo wedges before the voice coil will have cooled to an acceptable level to allow another seek. The second phase 12 of the RPO algorithm processes the CTV in order to adjust the reference servo wedge used to determine the latency for each pending command. For example, if the CTV is positive at the end of the current command, the reference servo wedge is extended to account for the number of servo wedges before the voice coil will have cooled to an acceptable level.

Figure 5:
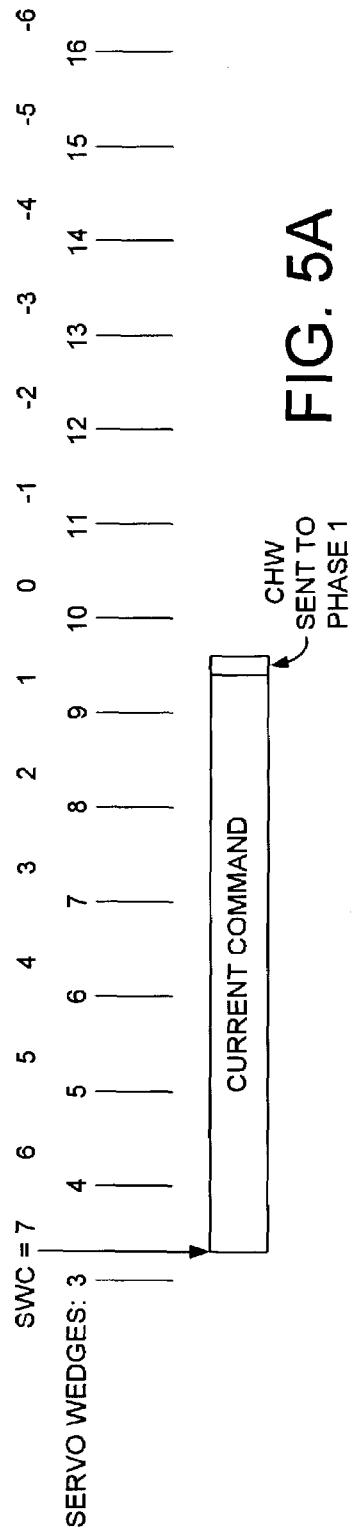
FIG. 5A shows an embodiment wherein while executing a current command a reference wedge (cylinder/head/wedge) is processed by the first phase of the RPO algorithm and a servo wedge counter (SWC) is decremented at each servo sector, wherein the second phase of the RPO algorithm selects the next command in response to the reference wedge, the wedge counter, and the real-time parameter.
FIG. 5B is a table showing how the reference servo wedge is adjusted by the second phase of the RPO algorithm relative to the SWC, the computational overhead, and a coil temperature of a voice coil motor according to an embodiment of the present invention.

In one embodiment, a servo wedge counter (SWC) is enabled relative to the reference servo wedge and modified as the head 6 passes each servo sector. When the first phase of the RPO algorithm terminates, the second phase of the RPO algorithm processes the SWC to select the next command to execute. This embodiment is illustrated in FIG. 5A which shows the disk controller 8 executing a current command wherein the reference servo wedge used by the first phase 10 of the RPO algorithm is the last servo wedge of the current command. In other words, the first phase 10 of the RPO algorithm computes the seek and rotational latencies for each of the pending commands relative to the last servo wedge of the current command. While processing the current command the disk controller 8 initializes the SWC relative to the current circumferential location of the head 6. In the example shown in FIG. 5A, the SWC is initialized to 7 and decremented each time the head 6 passes a servo sector. At the end of the first phase 10, the second phase 12 adjusts the reference servo wedge relative to the SWC, and then re-computes the rotational latency for each of the pending commands relative to the new reference servo wedge.

Consider, for example, that the first phase 10 of the RPO algorithm may not finish until the head 6 has passed the end of the current read command and the SWC decrements to −4. The second phase 12 of the RPO algorithm will re-compute the rotational latency for each of the pending commands after adding 4 to the reference servo wedge used by the first phase 10 of the RPO algorithm. If the disk drive is idle (not processing a current command), the current servo wedge (with respect to the location of the head 6) becomes the reference servo wedge and the SWC is initialized to 0. After executing the first phase 10 of the RPO algorithm, the reference servo wedge is adjusted by the SWC value and the second phase 12 of the RPO algorithm re-computes the rotational latency for each pending command relative to the adjusted reference servo wedge.

FIG. 5B shows a table according to an embodiment of the present invention wherein the reference servo wedge is adjusted relative to the SWC, a coil temp value (CTV) and a control wedge pad (CWP). The CWP is a constant which accounts for the overhead of the second phase calculations, plus the time required to transfer the next command to the DISK TASK, plus the time required to setup the seek parameters for the next command. The CWP may or may not be used to adjust the reference servo wedge depending on the value of the SWC and the CTV. In other words, if the SWC or CTV are greater than the CWP, then the CWP is ignored since its latency is essentially "buried" within the latency of the SWC and/or CTV.

Referring again to the table shown in FIG. 5B, if at the end of the first phase 10 of the RPO algorithm the SWC is positive, the CTV is positive (meaning a new seek must be delayed), and the DISK TASK is actively executing a current command, then the following adjustments are made. If the CWP is greater than the SWC, then the SWC is subtracted from the CWP; otherwise, CWP is subtracted from CWP (setting CWP to zero). If the SWC is greater then the CTV, then CTV is subtracted from CTV (setting CTV to zero); otherwise, the SWC is subtracted from the CTV. If the CWP is greater than the adjusted CTV then the CTV is subtracted from the CWP; otherwise, the CWP is subtracted from the CWP (setting the CWP to zero). The SWC is set to zero and the reference servo wedge is adjusted by:

Reference_Servo_Wedge −=SWC−CTV−CWP

If the SWC is a large value, then the CTV and CWP are irrelevant since there are still several servo wedges before the head 6 reaches the reference servo wedge of the first phase (i.e., the last servo wedge of the current command).

The SWC is set to zero so that the second phase 12 of the RPO algorithm uses the same reference servo wedge as the first phase 10 (the last servo wedge of the current command). However, if the SWC is near zero but still positive, then the CTV and/or CWP may cause the head 6 to pass the last servo wedge of the current command before the next seek operation can commence. Therefore the reference servo wedge is adjusted accordingly by the adjusted CTV and CWP values.

Referring again to the table shown in FIG. 5B, if at the end of the first phase 10 of the RPO algorithm the SWC is positive, the CTV is negative (meaning a seek can be initiated immediately), and the DISK TASK is actively executing a current command, then the following adjustments are made. If the CWP is greater than the SWC, then the SWC is subtracted from the CWP; otherwise, the CWP is subtracted from the CWP (setting the CWP to zero). The CTV and SWC are set to zero since they will not affect the reference servo wedge as adjusted by the above equation.

Referring again to the table shown in FIG. 5B, if at the end of the first phase 10 of the RPO algorithm the SWC is negative, the CTV is positive (meaning a new seek must be delayed), and the DISK TASK is not actively executing a current command, then the following adjustments are made. If the CWP is greater than the CTV, then the CTV is subtracted from the CWP; otherwise, the CWP is subtracted from the CWP (setting the CWP to zero). The SWC and CTV are not adjusted and the reference servo wedge is adjusted by the above equation.

Referring again to the table shown in FIG. 5B, if at the end of the first phase 10 of the RPO algorithm the SWC is negative, the CTV is negative (meaning a seek can be initiated immediately), and the DISK TASK is not actively executing a current command, then the CTV is set to zero and the SWC and CWP are not adjusted. The reference servo wedge is adjusted by the above equation.

Figure 6:
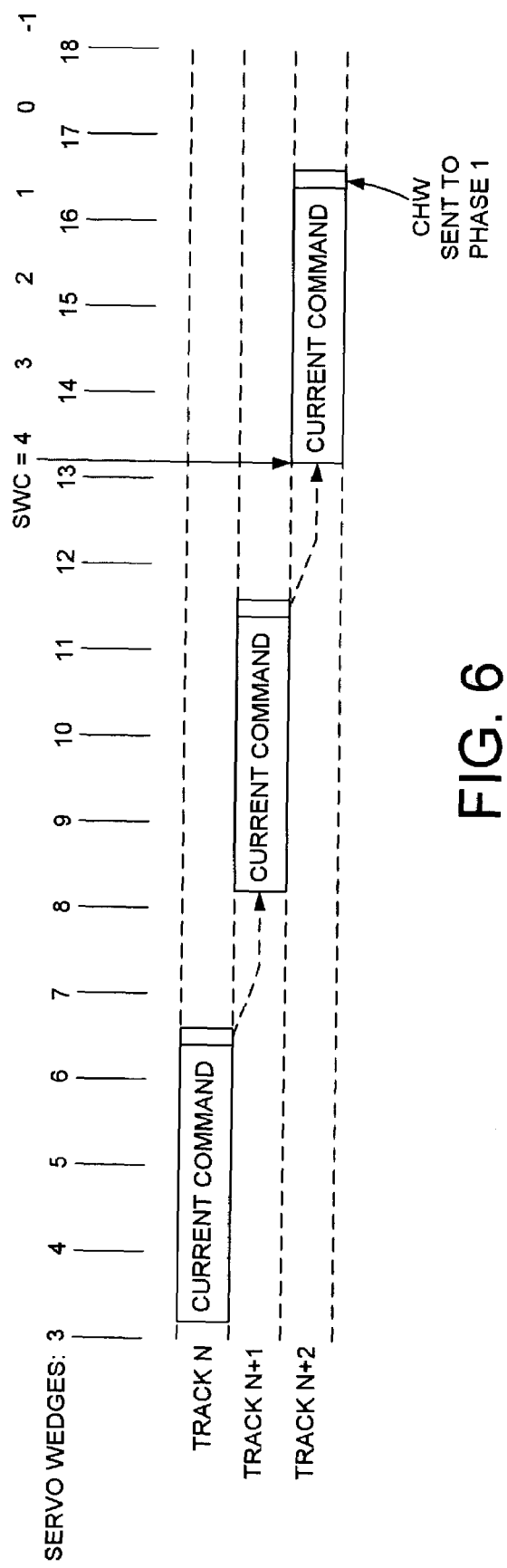
FIG. 6 shows an embodiment wherein a current command spans multiple tracks, wherein the servo wedge counter is initialized and enabled when the head reaches the last track of the current command.

FIG. 6 shows an embodiment of the present invention wherein a current command spans multiple tracks. The reference servo wedge (the last servo wedge of the last track) is processed by the first phase 10 of the RPO algorithm. The SWC is initialized and enabled when the head 6 reaches the first target sector of the last track of the current command. In the example shown in FIG. 6, the SWC is initialized to 4 when the head 6 reaches the first target sector of the last track (TRACK N+2) of the current command. The second phase 12 of the RPO algorithm is then enabled and begins executing once the first phase 10 terminates.

I claim:

1. A disk drive comprising:
   (a) a disk;
   (b) a head actuated radially over the disk; and
   (c) a disk controller for executing a rotational position optimization (RPO) algorithm for selecting a next command to execute out of a plurality of pending commands, wherein:
      the RPO algorithm comprises a first phase and a second phase;
      the first phase of the RPO algorithm is executed relative to a first priority to compute a seek latency and a rotational latency for at least one of the pending commands in response to at least one non-real-time parameter; and
      the second phase of the RPO algorithm is executed relative to a second priority higher than the first priority to update at least one of the seek latency and the rotational latency for the at least one pending command in response to at least one real-time parameter.

2. The disk drive as recited in claim 1, wherein:
   (a) the disk drive further comprises:
      a plurality of allocation state queues for storing commands comprising cache segments; and
      a plurality of allocation states comprising:
         an available—allocation state indicating an allocated cache segment storing write data that has been written to the disk;
         a valid—allocation state indicating an allocated cache segment storing cached read data; and
         a dirty—allocation state indicating an allocated cache segment storing write data not yet written to the disk; and
   (b) the non-real time parameter comprises at least one of the allocation states.

3. The disk drive as recited in claim 1, wherein the non-real time parameter comprises a cache segment size.

4. The disk drive as recited in claim 1, wherein:
   (a) the disk drive further comprises a voice coil motor for actuating the head radially over the disk; and
   (b) the real time parameter comprises a temperature of the voice coil motor.

5. The disk drive as recited in claim 1, wherein:
   (a) the disk comprises a plurality of tracks, each track comprising a plurality of blocks and a plurality of embedded servo sectors recorded at a predetermined interval;
   (b) the disk controller enables a counter relative to a reference servo sector;
   (c) the disk controller modifies the counter as the head passes each servo sector; and
   (d) when the first phase of the RPO algorithm terminates, the second phase of the RPO algorithm processes the counter to select the next command to execute.

6. A method of executing a rotational position optimization (RPO) algorithm in a disk drive for selecting a next command to execute out of a plurality of pending commands, the disk drive comprising a disk and a head actuated radially over the disk, and the RPO algorithm comprising a first phase and a second phase, the method comprising the steps of:
   executing the first phase of the RPO algorithm relative to a first priority to compute a seek latency and a rotational latency for at least one of the pending commands in response to at least one non-real-time parameter; and
   executing the second phase of the RPO algorithm relative to a second priority higher than the first priority to update at least one of the seek latency and the rotational latency for the at least one pending command in response to at least one real-time parameter.

7. The method as recited in claim 6, wherein:
   (a) the disk drive further comprises:
      a plurality of allocation state queues for storing commands comprising cache segments; and
      a plurality of allocation states comprising:
         an available—allocation state indicating an allocated cache segment storing write data that has been written to the disk;
         a valid—allocation state indicating an allocated cache segment storing cached read data; and
         a dirty—allocation state indicating an allocated cache segment storing write data not yet written to the disk; and
   (b) the non-real time parameter comprises at least one of the allocation states.

8. The method as recited in claim 6, wherein the non-real time parameter comprises a cache segment size.

9. The method as recited in claim 6, wherein:
(a) the disk drive further comprises a voice coil motor for actuating the head radially over the disk; and
(b) the real time parameter comprises a temperature of the voice coil motor.

10. The method as recited in claim 6, wherein the disk comprises a plurality of tracks, each track comprising a plurality of blocks and a plurality of embedded servo sectors recorded at a predetermined interval, further comprising the steps of:
(a) enabling a counter relative to a reference servo sector;
(b) modifying the counter as the head passes each servo sector; and
(c) when the first phase of the RPO algorithm terminates, processing the counter during the second phase of the RPO algorithm to select the next command to execute.

11. A disk drive comprising:
(a) a disk;
(b) a head actuated radially over the disk;
(c) a plurality of allocation state queues for storing commands comprising cache segments;
(d) a plurality of allocation states comprising:
an available allocation state indicating an allocated cache segment storing write data that has been written to the disk;
a valid allocation state indicating an allocated cache segment storing cached read data; and
a dirty allocation state indicating an allocated cache segment storing write data not yet written to the disk; and
(e) a disk controller for executing a rotational position optimization (RPO) algorithm for selecting a next command to execute out of a plurality of pending commands, wherein:
the RPO algorithm comprises a first phase and a second phase;
the first phase of the RPO algorithm is executed relative to a first priority and in response to at least one non-real-time parameter;
the second phase of the RPO algorithm is executed relative to a second priority higher than the first priority and in response to at least one real-time parameter; and
the non-real time parameter comprises at least one of the allocation states.

12. A method of executing a rotational position optimization (RPO) algorithm in a disk drive for selecting a next command to execute out of a plurality of pending commands, the disk drive comprising a disk and a head actuated radially over the disk, a plurality of allocation state queues for storing commands comprising cache segments, and a plurality of allocation states comprising:
an available allocation state indicating an allocated cache segment storing write data that has been written to the disk;
a valid allocation state indicating an allocated cache segment storing cached read data; and
a dirty allocation state indicating an allocated cache segment storing write data not yet written to the disk;
the RPO algorithm comprising a first phase and a second phase, the method comprising the steps of:
executing the first phase of the RPO algorithm relative to a first priority and in response to at least one non-real-time parameter; and
executing the second phase of the RPO algorithm relative to a second priority higher than the first priority and in response to at least one real-time parameter, wherein the non-real time parameter comprises at least one of the allocation states.

* * * * *